UNITED STATES PATENT OFFICE.

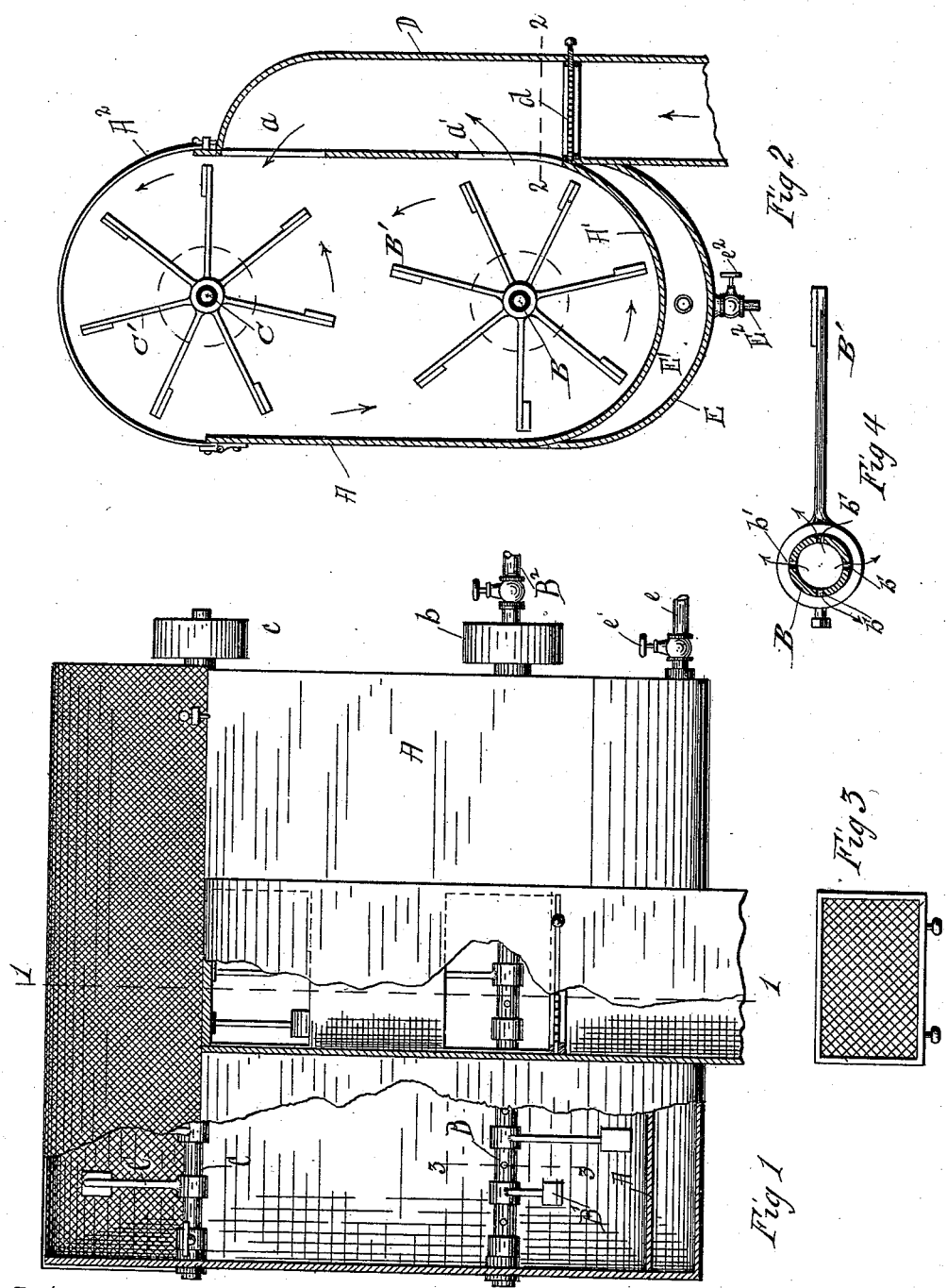

JOHN BAUR, OF CHICAGO, ILLINOIS.

FEATHER-RENOVATOR.

SPECIFICATION forming part of Letters Patent No. 464,213, dated December 1, 1891.

Application filed March 6, 1889. Serial No. 302,165. (No model.)

*To all whom it may concern:*

Be it known that I, JOHN BAUR, a citizen of the United States, residing at Chicago, in the county of Cook and State of Illinois, have invented a certain new and useful Improvement in Feather-Renovators, which is fully set forth in the following specification, reference being had to the accompanying drawings, in which—

Figure 1 is a side elevation of a construction embodying my invention, portions of the casing being broken away to show the internal construction; Fig. 2, a sectional view taken on the line 1 1 of Fig. 1; Fig. 3, a detail plan view taken on the line 2 2 of Fig. 2, and Fig. 4 an enlarged detail sectional view taken on the line 3 3 of Fig. 1.

Like letters refer to like parts in all the figures of the drawings.

My invention relates to feather-renovators, and has for its object to provide a simple and effective apparatus whereby feathers which have become dirty and lost their elasticity may be effectually cleaned and purified and restored to their former elastic condition, and whereby new feathers may be thoroughly cleaned of the dust, scales, &c., adhering to them and put in condition for use.

To these ends my invention consists in certain novel features, which I will now proceed to describe, and will then particularly point out in the claims.

In the drawings, A represents a suitable casing, preferably rectangular and vertical, and provided with a semi-cylindrical bottom A' and a similarly-shaped apertured top $A^2$, this latter being constructed of wire-gauze or perforated metal, and preferably hinged so as to open when desired.

B represents a shaft extending horizontally through the casing A near the bottom thereof, and provided with beaters or stirrers B', of any suitable form, to operate upon the feathers. The shaft B is provided with a pulley $b$, by means of which it may be driven from any suitable source of power and is a hollow shaft, so that steam may be admitted into its interior through a steam-pipe $B^2$, connected to it at its outer end in any suitable manner. The shaft B is provided within the casing A with perforations $b'$, which form outlets, by means of which the steam may pass from the interior of said shaft into the interior of the casing. C represents a second shaft, arranged parallel to the shaft B near the top of the casing A, and provided with similar beaters or stirrers C' and a similar driving-pulley $c$. The curvature of the apertured top $A^2$ conforms to the curved path of the beaters C', which pass close to said curved top when in motion.

D represents an air-trunk through which a blast of air may be discharged into the casing from a fan-blower or other suitable source. This air-trunk is so arranged that its upper portion extends along the front of the casing A, and there is formed through the said casing at the upper end of the air-trunk, which is also the upper end of the vertical portion of the casing, an opening $a$, which is thus located immediately adjacent to the beater-shaft C. $a'$ represents a similar opening formed through the casing A' at the bottom of the vertical portion thereof, opposite the beater-shaft B, and establishing communication between the casing A and air-trunk D at this point. Immediately below the opening $a'$ the air-trunk D is provided with a screen $d$. Any desired number of these trunks may be employed, corresponding openings being of course formed in the casing. Below the bottom A' of the casing A is a second or false bottom E, whereby there is formed between the bottom A and false bottom E a steam-space E', into which steam may be admitted by means of a steam-pipe $e$, provided with a controlling-valve $e'$.

$E^2$ represents a drip-pipe provided with a controlling-valve $e^2$, by means of which pipe the water of condensation may be withdrawn from the steam-space E' when desired.

The apparatus thus organized operates in the following manner: The feathers to be treated having been placed within the casing A and the top $A^2$ thereof closed, motion is imparted to the beater-shafts B and C, and at the same time steam is admitted to the interior of the shaft B, and passing out through the apertures $b'$ therein comes in contact with the feathers. These latter are circulated by means of the two beater-shafts, so as to move in an elliptical path, and are thereby thoroughly stirred up and exposed to the action of the steam, which latter serves to remove the impurities therefrom and thoroughly cleanse them, the impure steam passing out through the apertured top $A^2$. During these operations a blast of cold air is admitted through the air-trunk D, so that the feathers are submitted to the action of this cold blast of air while being steamed and stirred. Moreover, the feathers will be worked by the lower beater-shaft through the opening $a'$ into the trunk and will be carried up by the air-blast through the said trunk and discharged through the opening $a$ into the casing again, at which point they are received by the beater-shaft C and their circulating motion continued thereby. The upper shaft C is driven at a very high rate of speed and serves to prevent the feathers from clogging the wire-gauze covering, and thereby preventing the free exit of the steam and air. Moreover, being driven at this high rate of speed, it causes a frictional action between the feathers and the wire-gauze which will effectually scrape therefrom any dust or scales which may adhere to them, as is the case particularly with new feathers. The lower shaft, on the other hand, revolves at a comparatively low speed, its object being, principally, to prevent the feathers from collecting and remaining stationary at the bottom of the casing, and at the same time to feed them through the aperture $a'$ into the air-trunk. After the feathers have been subjected to the direct action of the steam for a sufficient length of time the supply of steam to the interior of the casing is cut off, the cold blast, however, continuing and the beater-shafts still continuing to operate, so that the feathers are circulated and blown to cleanse and dry the same. Steam is admitted to the steam-space $E'$ at the bottom of the casing either during the whole of the operation or during any portion or portions thereof, as desired, and serves to heat the air and cause it to absorb and carry off the moisture. The feathers are discharged in any suitable manner. In the form of apparatus shown this result is obtained by simply opening the top and allowing the blast, in conjunction with the beaters, to discharge the feathers from the casing. The screen D serves to prevent any heavy objects from dropping down the air-trunk into the fan and thereby clogging the same.

It will be seen that a continuous circulation is obtained in the apparatus, the lower beater-shaft working the feathers through the lower opening into the trunk through which a constant blast of cold air is forced. The feathers are thereby carried up and returned to the casing to go through the same process again and again until they are in a perfectly-developed condition, having lost all odor, dust, and animal matter. To make this circulation possible, a free discharge of the air-blast must be secured, and this is accomplished by having the upper beater-shaft revolve at such a speed as to cause a current of air of sufficient force to remove the feathers from the apertured top of the apparatus, against which they are held by the air-pressure due to the blast. The feathers receive quite a rubbing against the apertured top, by which friction all the animal matter, consisting of scales and skins, which adheres to the quilly part of the feathers is removed. This rubbing also helps to develop the feathers— that is to say, if the feathers are in a pressed condition, so that the fibers are shortened, whereby they are rendered heavy, every part of the fiber will be extended to its full natural length. By simultaneously stirring, blowing, and steaming the whole mass of feathers becomes loosened, so that the steam and air will act upon each individual feather in the apparatus, thereby rendering it possible to obtain very superior results in a very short time. The steaming is employed chiefly to soften the feathers, and thereby facilitate the removal and evaporation of the unpleasant odors thereof. As a constant current of cold air is passed through the feathers, overheating is prevented, and consequently the brittleness caused thereby.

It is obvious that various modifications in the details of construction may be made without departing from the principle of my invention. For instance, any desired method of introducing the feathers into and removing them from the casing may be adopted, the method described being only one of numerous well-known methods having this object in view. The same is true of the method of introducing the steam shown and described, and although I prefer the construction shown for this purpose yet any other well-known mode of introducing steam into the casing may be employed. I therefore do not wish to be understood as limiting myself strictly to the precise details hereinbefore described, and shown in the drawings.

Having thus described my invention, what I claim as new, and desire to secure by Letters Patent, is—

1. In a feather-renovator, the combination, with the casing provided with an apertured top, of a shaft provided with beaters arranged near said top and driven at a high speed, and a second parallel shaft arranged near the bottom of the casing and driven at a comparatively low rate of speed, substantially as and for the purposes specified.

2. In a feather-renovator, the combination, with the casing provided with an apertured top, of the parallel beater-shafts arranged therein near the top and bottom of said casing, respectively, and an air-trunk communicating with said casing to pass a blast of air through the same, substantially as and for the purposes specified.

3. In a feather-renovator, the combination, with the casing provided with an apertured top, of the parallel beater-shafts arranged therein near the top and bottom, respectively, an air-trunk communicating with said casing to pass a blast of air through the same, and a steam-pipe communicating with the interior of said casing, substantially as and for the purposes specified.

4. In a feather-renovator, the combination, with the casing provided with an apertured top, of the parallel shafts arranged therein near the top and bottom, respectively, the lower shaft being hollow and apertured and connected to a suitable steam-supply, substantially as and for the purposes specified.

5. In a feather-renovator, the combination, with the casing and the parallel shafts arranged therein at top and bottom and provided with beaters, of the air-trunk arranged adjacent to said casing and communicating therewith by means of openings $a\ a'$, substantially as and for the purposes specified.

6. In a feather-renovator, the combination, with the casing provided with an apertured top, of the air-trunk communicating therewith by two openings located at the top and bottom, respectively, the lower beater-shaft arranged opposite the lower opening and driven at a comparatively low speed and the upper beater-shaft arranged at the top of the casing and driven at a high speed, substantially as and for the purposes specified.

7. In a feather-renovator, the combination, with the casing having openings $a$ and $a'$, and the beater-shafts arranged within said casing, of the air-trunk D, extending over said openings and provided with screen $d$ below the lower opening, substantially as and for the purposes specified.

8. In a feather-renovator, the combination, with the casing A, having openings $a$ and $a'$ and apertured top $A^2$, of the false bottom E, forming, with the casing, steam-space $E'$, the beater-shafts arranged within said casing at top and bottom, and the air-trunk arranged adjacent to said casing and communicating with the interior of the same through the openings $a$ and $a'$, substantially as and for the purposes specified.

JOHN BAUR.

Witnesses:
ALICE McIVER,
IRVINE MILLER.